US010152618B2

(12) United States Patent
Chadbourne

(10) Patent No.: US 10,152,618 B2
(45) Date of Patent: Dec. 11, 2018

(54) READER, WRITER AND METHOD FOR PROGRAMMABLE TAGS

(71) Applicant: Bibliotheca Limited, Stockport (GB)

(72) Inventor: Andrew Chadbourne, Stockport (GB)

(73) Assignee: BIBLIOTHECA LIMITED, Stockport (GB)

( * ) Notice: Subject to any disclaimer, the term of this patent is extended or adjusted under 35 U.S.C. 154(b) by 0 days.

(21) Appl. No.: 15/378,496

(22) Filed: Dec. 14, 2016

(65) Prior Publication Data

US 2017/0103238 A1    Apr. 13, 2017

Related U.S. Application Data

(63) Continuation of application No. 14/500,125, filed on Sep. 29, 2014.

(30) Foreign Application Priority Data

Sep. 30, 2013  (GB) .................................. 1317292.9

(51) Int. Cl.
*G06K 7/10* (2006.01)
*G06K 19/073* (2006.01)

(52) U.S. Cl.
CPC ..... *G06K 7/10297* (2013.01); *G06K 7/10257* (2013.01); *G06K 7/10366* (2013.01); *G06K 19/073* (2013.01)

(58) Field of Classification Search
CPC ............. G06K 7/10257; G06K 19/073; G06K 7/10297; G06K 7/10366

USPC ....................................................... 340/10.51
See application file for complete search history.

(56) References Cited

U.S. PATENT DOCUMENTS

| 5,008,661 A * | 4/1991 | Raj .................... B61L 25/04 340/10.33 |
| 6,052,062 A | 4/2000 | Tuttle |
| 6,885,288 B2 | 4/2005 | Pincus |
| 8,049,594 B1 * | 11/2011 | Baranowski .......... H04L 9/3271 340/10.1 |
| 2004/0134994 A1 * | 7/2004 | Zaba .................... G06K 19/025 235/492 |
| 2008/0069347 A1 * | 3/2008 | Brown ................. H04L 9/3066 380/45 |
| 2012/0099725 A1 * | 4/2012 | Sakazaki ................ G06F 21/73 380/28 |

FOREIGN PATENT DOCUMENTS

| CN | 103473592 A1 | 12/2013 |
| JP | 2012194943 A | 10/2012 |
| KR | 100834701 B1 | 5/2008 |
| KR | 20090092488 A | 9/2009 |
| WO | 2009093111 A2 | 7/2009 |

* cited by examiner

*Primary Examiner* — Edwin Holloway, III
(74) *Attorney, Agent, or Firm* — Leason Ellis LLP

(57) ABSTRACT

A tag writer, reader and method are disclosed. The tag writer is operable to generate a security identifier during writing of data to the tag, the security identifier being dependent on one or more of the data written, data already on the tag, metadata associated with the data, the tag and/or the writing of the data.

18 Claims, 5 Drawing Sheets

READER, WRITER AND METHOD FOR PROGRAMMABLE TAGS

This patent application is a continuation of U.S. patent application Ser. No. 14/500,125, titled "READER, WRITER AND METHOD FOR PROGRAMMABLE TAGS" filed on Sep. 29, 2014, which also claims the benefit of priority under 35 U.S.C. Section 119(a) of Great Britain Patent Application No. 1317292.9, filed Sep. 30, 2013, which are each hereby incorporated by reference as if set forth in their respective entireties herein.

FIELD OF THE INVENTION

The present invention relates to a reader, writer and method for programmable identifiers such as RFID and NFC type tags.

BACKGROUND OF THE INVENTION

Programmable identifiers such as RFID (Radio Frequency Identification) and NFC (Near Field Communication) tags are commonplace in many applications, particularly in customer/user based applications such as retail sales and inventory management.

Typically, a programmable tag is fixed or otherwise embedded into an article to be monitored or tracked. This can be, for example: via a removable security device that may be adhered to a book, clipped to garments etc. to prevent theft from shops; affixed to a box or interior of an item via an adhesive pad or similar or the tag may be integrated into the item or packaging during manufacture.

A programmable tag typically includes an antenna coupled to some form of memory. The memory can be interrogated and in some cases altered via appropriate signals received by the antenna.

Tracking and interrogation of tags can be done in many ways, although typical methods are via use of hand-held scanner type devices at checkouts/point of receipt or departure and via readers positioned in premises such that a tag must pass through them (for example by the door of a shop or the like). Actions taken when a tag is encountered vary depending on application. For example—in package tracking it may just be to record when the package entered or left a facility or vehicle. In retail, the passage of a tag through a portal typically causes an alarm to be sounded (because tags are typically removed or disabled at the point of sale).

One particular application where programmable identifiers are in frequent use and are also frequently programmed and reprogrammed to show loan status is in lending libraries where a tag may be used to identify a book or other item being borrowed or returned and link to the lender's account to identify fines due and the like. In such cases, attributes of the tag are also used to identify whether the item has been successfully lent and can be allowed off-premises. Often the check-out procedure is done by the user via a kiosk or similar without staff interaction so the user may be responsible for correctly "programming" the tag (positioning it so the kiosk can read it and write to it).

During the early implementation of RFID and similar tags, at least some of the security they provided was through obscurity—nobody could read or write to them without the appropriate (typically bespoke) hardware and software.

However, this is no longer the case, particularly with the advent of NFC capable smart phones.

SUMMARY OF THE INVENTION

According to an aspect of the present invention, there is provided a tag writer for a programmable tag, the tag writer being operable to generate a security identifier during writing of data to the tag, the security identifier being dependent on one or more of the data written, data already on the tag, metadata associated with the data, the tag and/or the writing of the data.

Preferably, the security identifier is a checksum, hash, encrypted digest or other identifier. Preferably the security identifier is written to a data repository for future authentication of the tag and security identifier. Preferably the security identifier is repeatable from the data on the tag and the identifier is stored elsewhere whereby upon presentation of the tag, validity of the data on the tag can be authenticated by comparison of the security identifier on the tag with that held in the data repository.

In one embodiment, the security identifier is derived from security status and/or content of a user memory area of the tag. In one embodiment, one of the data from the user memory area and data on the security status is appended to the other and a checksum or other function is applied to the combined value to generate the security identifier.

Optionally, the security identifier or a part of the security identifier may be written so as to be integral to the data on the tag, wherein reprogramming of the tag changes or deletes the security identifier.

Preferably, the tag includes a unique identifier. The unique identifier may be physically written or etched on to the tag or its packaging, it may be written or encoded in the tag memory or it may be otherwise linked to the tag. Preferably, the security identifier is linked to the unique identifier in the data repository. Most preferably, the data repository is indexed by the unique identifier of tags and is arranged to receive communications specifying or requesting security identifiers by unique identifier.

Optionally, data on the tag from which the security identifier is derived is written to a backup data repository. Optionally, a subset of data on the tag is used to generate the security identifier. Optionally, data defining the subset is associated with the unique identifier or other information identifying the tag.

According to another aspect of the present invention, there is provided a tag reader operable to read data from a memory of a programmable tag and generate a security identifier from the read data, the tag reader being arranged to compare the security identifier to a previously calculated security identifier for the tag to authenticate the data in the memory.

The tag preferably has a unique identifier. The unique identifier may be stored in the tag memory and/or may be physically written on or etched into the tag or otherwise linked to the tag. Preferably, the security identifier is written to a data repository with a link to the unique identifier, the data repository being responsive to provide the security identifier upon receipt of the unique identifier. It will be appreciated that the reader need not necessarily do the calculation and may simply pass on read data from the tag for authentication. For example, the data repository may be part of a security system and is arranged to receive data read from a tag and calculate a security identifier therefrom, authentication being made if the calculated security identifier matches the security identifier in the data repository.

In one embodiment, the reader may include or be linked to a tag writer, wherein upon failure to authenticate the read data in a tag to the stored security identifier, the tag writer may be triggered to overwrite data in the tag with data in a backup data repository defining default data values and/or the immediate past value of data written to the tag to which it should be returned such that it matches the security identifier.

Modern mobile phones that contain NFC readers are actually fully-fledged RFID reader/writer devices and so can be used to deliberately modify data stored on any HF (13.56 MHz) RFID tag, including those used in libraries and in retail environments. This presents a problem in that tag data could be maliciously changed and security could be deactivated to allow items to leave the library or retail facility without sounding security gates. Embodiments of the present invention seek to address this issue by use of a security identifier such as a checksum that is calculated at write time and stored separately to the tag. The identifier can be used to authenticate data being later read because if the data had changed, it would not be possible to recreate the identifier. Optionally, an alarm or other alert may be raised on failure to authenticate. In one embodiment, the data may be returned to a default or past recorded state on failure to authenticate—for example a library book may have its tag maliciously tampered with to avoid an alarm sounding as it leaves the premises, upon a portal detecting a tag that is disarmed and has data that does not reflect a proper checkout, the tag may be re-armed so as to trigger an alarm as it leaves the building.

In preferred embodiments, whenever a tag is programmed (using any device) a checksum is made. This checksum is derived from a combination of the security status and the user memory area. The checksum is written to a database together with the unique ID of the RFID tag. This unique ID may be laser-etched at production time so as to be unique and also unalterable.

Once this data is held, the database can be queried at every point the tag is read. A very quick process can compare the unique ID to the checksum and therefore give a positive/negative response as to if the data is accurate or it may be have been changed.

BRIEF DESCRIPTION OF THE DRAWINGS

Embodiments of the present invention will now be described, by way of example only with reference to the accompanying drawings in which.

DETAILED DESCRIPTION OF CERTAIN EMBODIMENTS OF THE INVENTION

Figure 1:
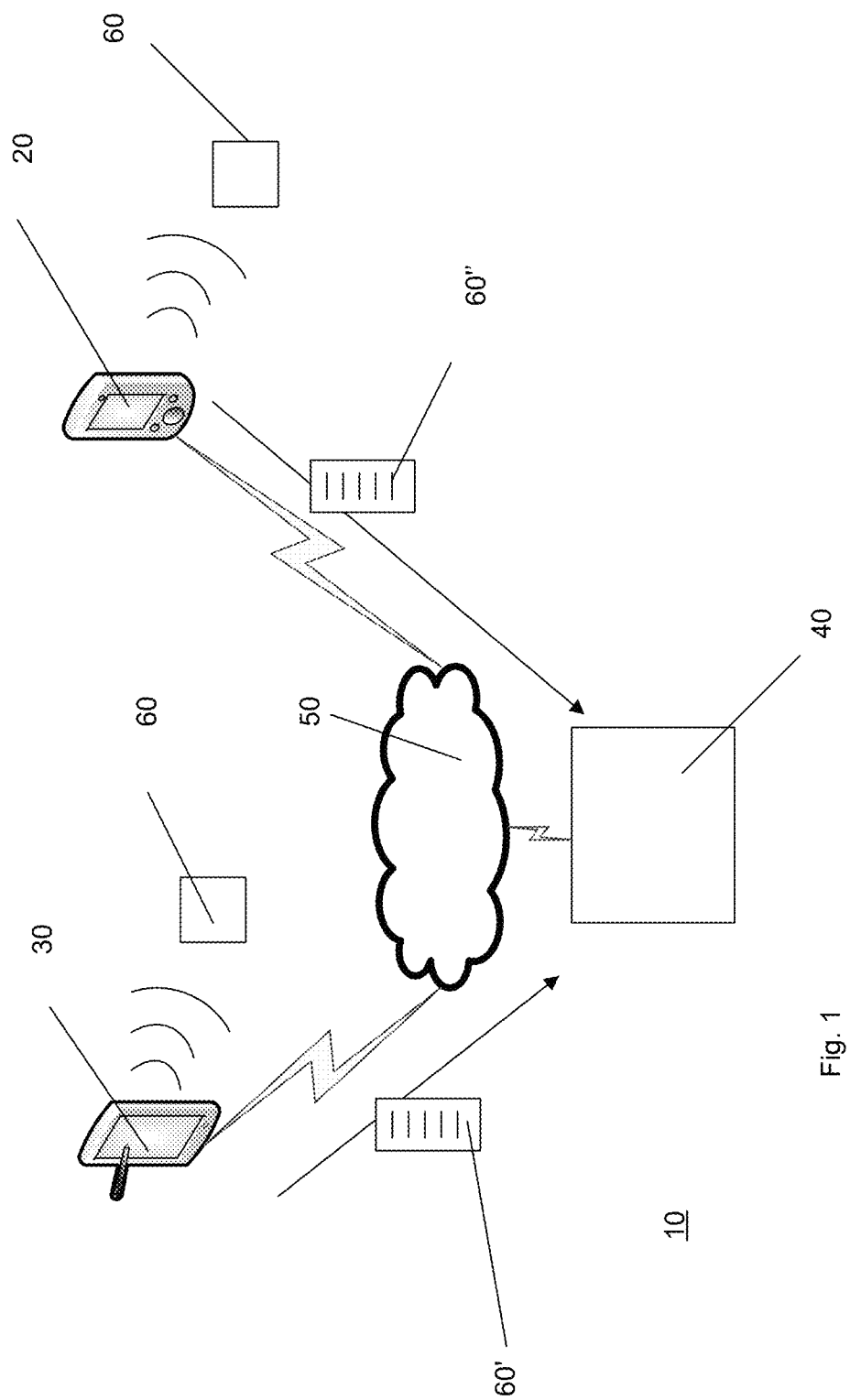
FIGS. 1-4 are schematic diagrams of a control system according to an embodiment of the present invention.

FIG. 1 is a schematic diagram of a control system according to an embodiment of the present invention.

The control system 10 includes a tag reader 20 and a tag writer 30 (although it will be appreciated that in some embodiments, a single entity may act as a reader and writer). The control system 10 also includes a data repository 40 which is arranged to communicate with the tag reader 20 and writer 30, for example over a wired or wireless data communication network 50.

Upon writing data to a programmable tag 60, the tag writer 30 is configured to generate a security identifier 60'. The security identifier is dependent on one or more of the data being written, data already on the tag, metadata associated with the data, the tag and/or the writing of the data (for example, the origin of the data, time/date when written, data identifying the tag writer etc.).

The security identifier 60' may be a checksum, hash, encrypted digest or other identifier.

The security identifier 60' is communicated to the data repository 40 where it is stored for future authentication of the tag and its data.

The security identifier 60' may be computed from a one-way calculation (so that the data itself may not be recoverable from the identifier but the identifier itself can be re-computed if the same data is provided as input to the calculation).

Preferably the security identifier 60' is repeatable from the data on the tag and the identifier is stored elsewhere whereby upon presentation of the tag, validity of the data on the tag can be authenticated by comparison of the security identifier on the tag with that held in the data repository.

Figure 2:
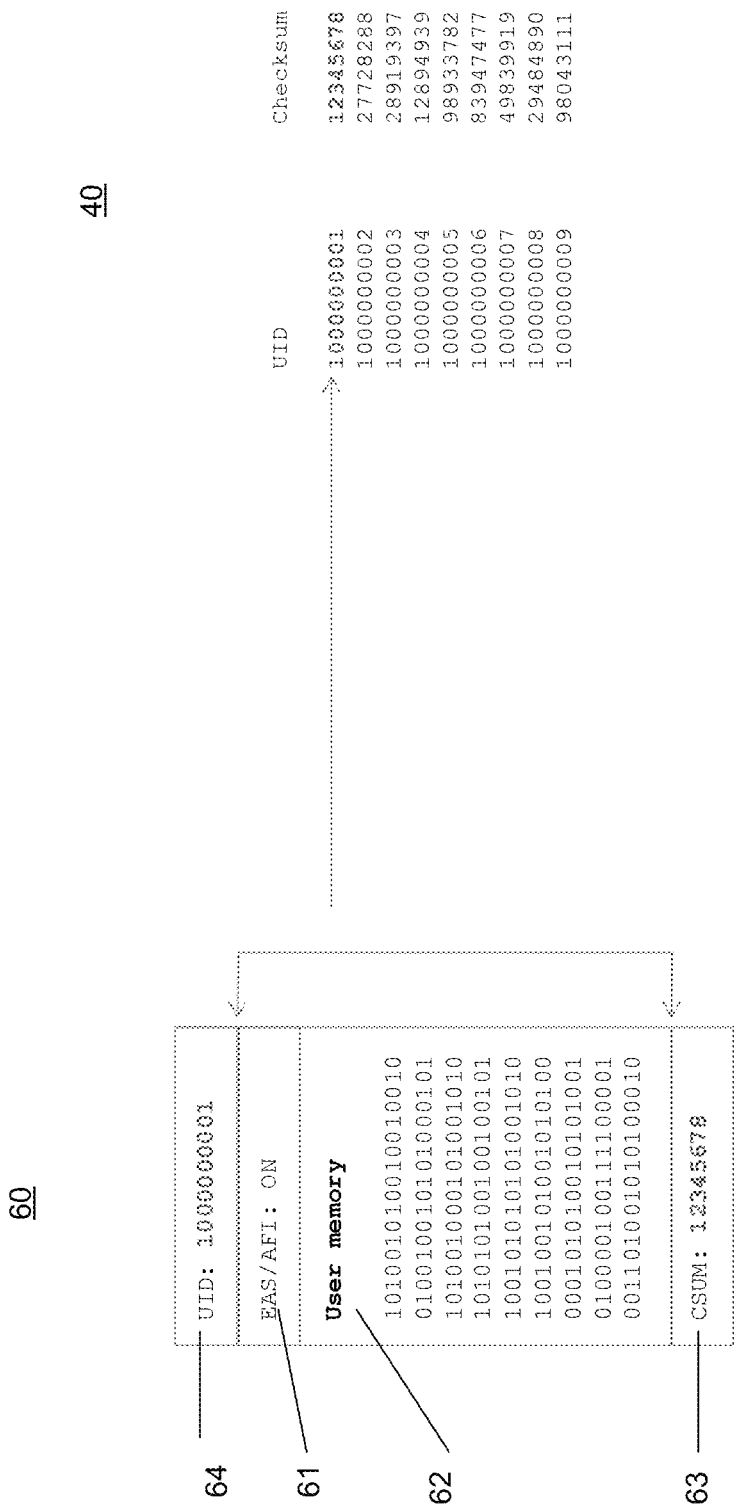

In one embodiment, the security identifier is derived from a security status field 61 and the content of a user memory area 62 of the tag 60, as shown in FIG. 2. One of the data from the user memory area and data on the security status is appended to the other (as long as the order is consistently applied during operation it does not matter which is first) and a checksum or other function is applied to the combined value to generate the security identifier.

Optionally, the security identifier 60' or a part of the security identifier may be written to the tag in a field 63. Alternatively, it may be written so as to be integral to the data on the tag, for example as the last n digits of the user memory area. In such an arrangement, reprogramming of the tag changes or deletes the security identifier and can immediately be spotted without needing to recomputed the security identifier.

Preferably, the tag includes a unique identifier written in a field 64 (it may also or alternatively be etched on to the tag or its packaging, or otherwise linked to the tag).

Preferably, the security identifier is linked to the unique identifier in the data repository 40. The data repository may be indexed by the unique identifier of tags, for example, and is arranged to receive communications specifying or requesting security identifiers by unique identifier.

Figure 3:
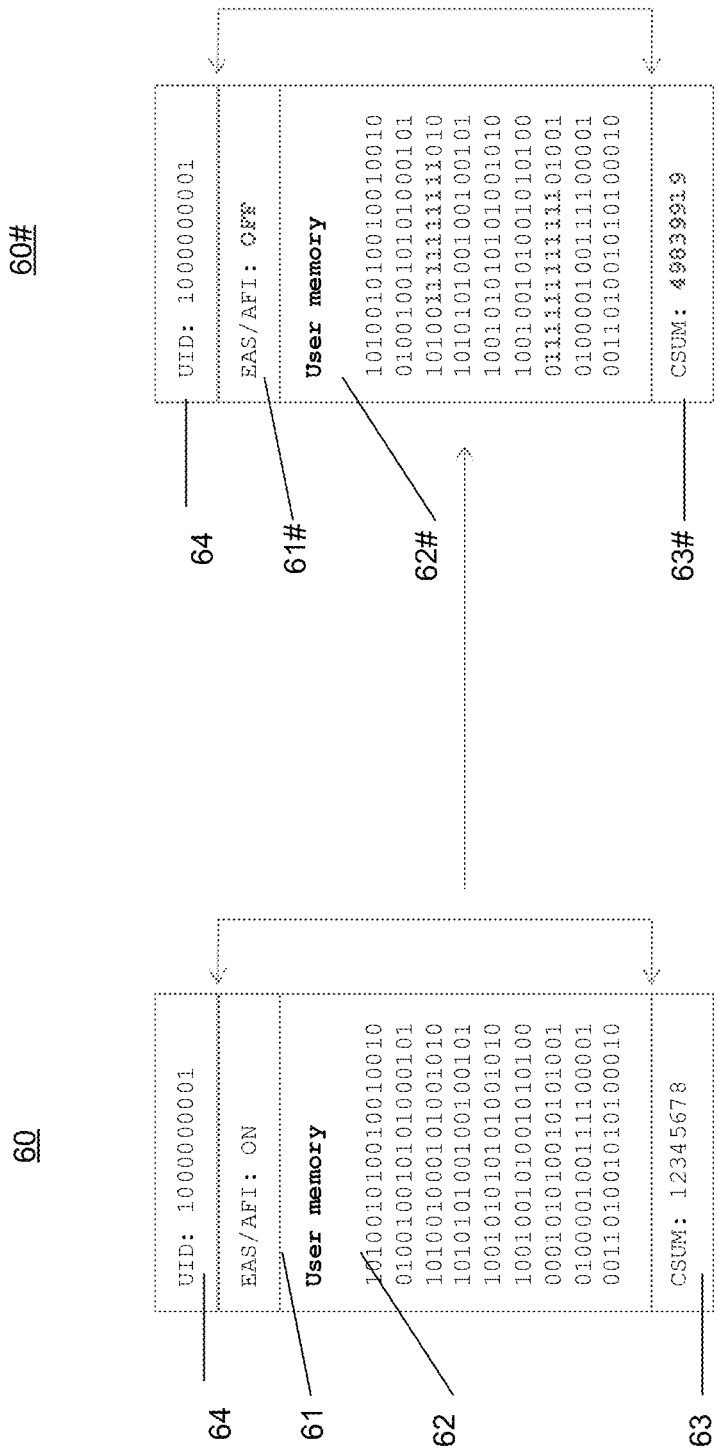
Figure 4:
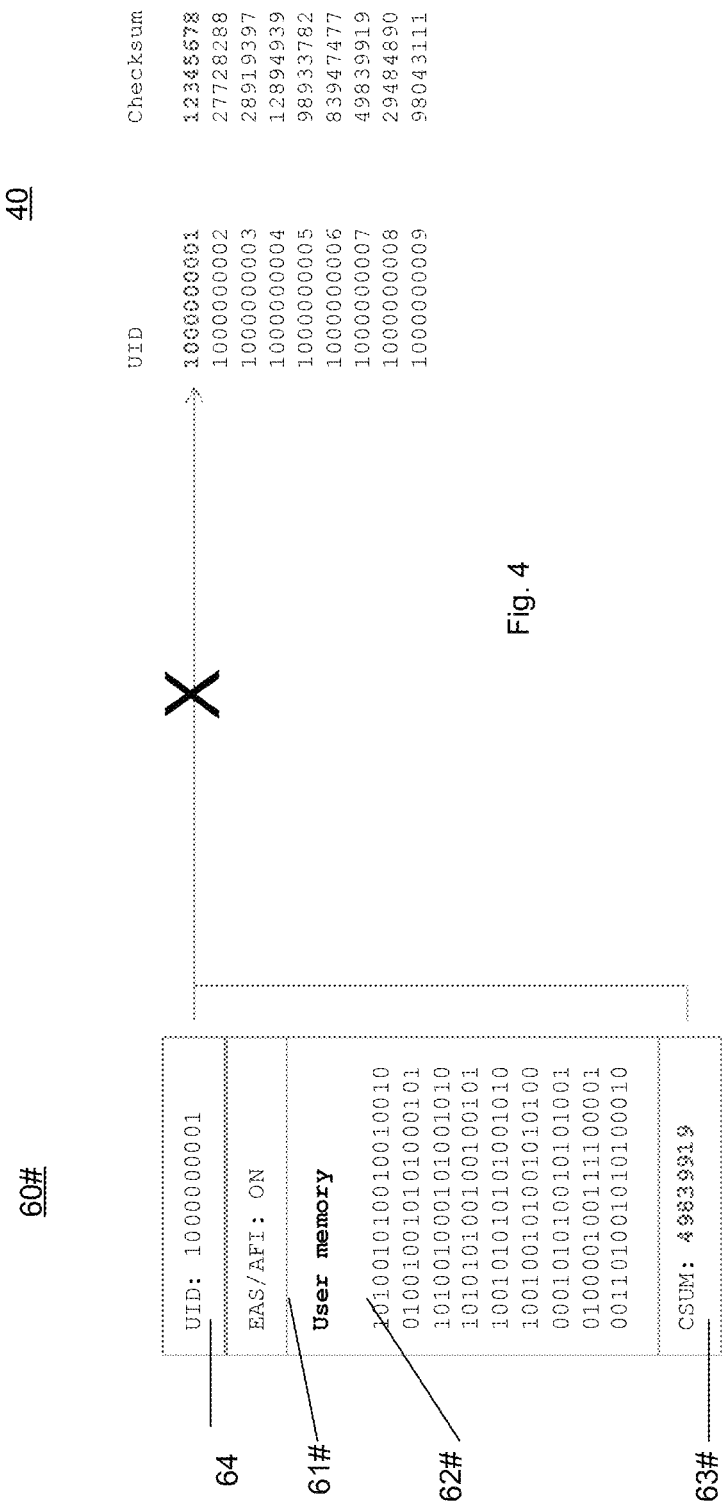

The tag reader 20 is configured to read data from a memory of a presented programmable tag 60. A security identifier 60" is generated from the read data (either by the reader or by a device or service to which the reader communicates the read data). The security identifier 60" is then compared to a previously calculated security identifier 60' for the tag 60 that is held in the data repository 40 to authenticate the data in the memory. If the data is manipulated, the tag 60# would have data such that a different security identifier 63# would be created when the function is next applied to the data 61#, 62#. Authentication would fail as the comparison to the identifier stored in the repository would report a mismatch, as shown in FIGS. 3 and 4.

In one example, the data repository may operate as a service, returning the previously calculated security identifier 60' upon presentation of the corresponding unique identifier for the tag. In another example, the data repository may receive both the unique identifier and read data or the unique identifier and calculated security identifier and return an authentication result (thereby reducing calculations needed to be performed by the reader and also reducing risk that a stolen reader or writer could be reverse engineered to determine the function used to calculate security identifiers).

To further increase security, the function generating the security identifier need not necessarily operate on all of the data in the user memory area and may, for example, be configurable to operate on a selected bit pattern or the like.

In such an arrangement, the bit pattern may be linked to the unique identifier and stored or otherwise referenced in the data repository.

The security identifier may be stored in the tag, either in its own field or at the start/end of or elsewhere in the user memory area. In the latter case, in a similar way to the bit pattern, a mask or other data identifying position of the security identifier could be stored to allow this to be recovered (or else dropped from the user memory area before the security identifier is re-computed at read time).

Figure 5:
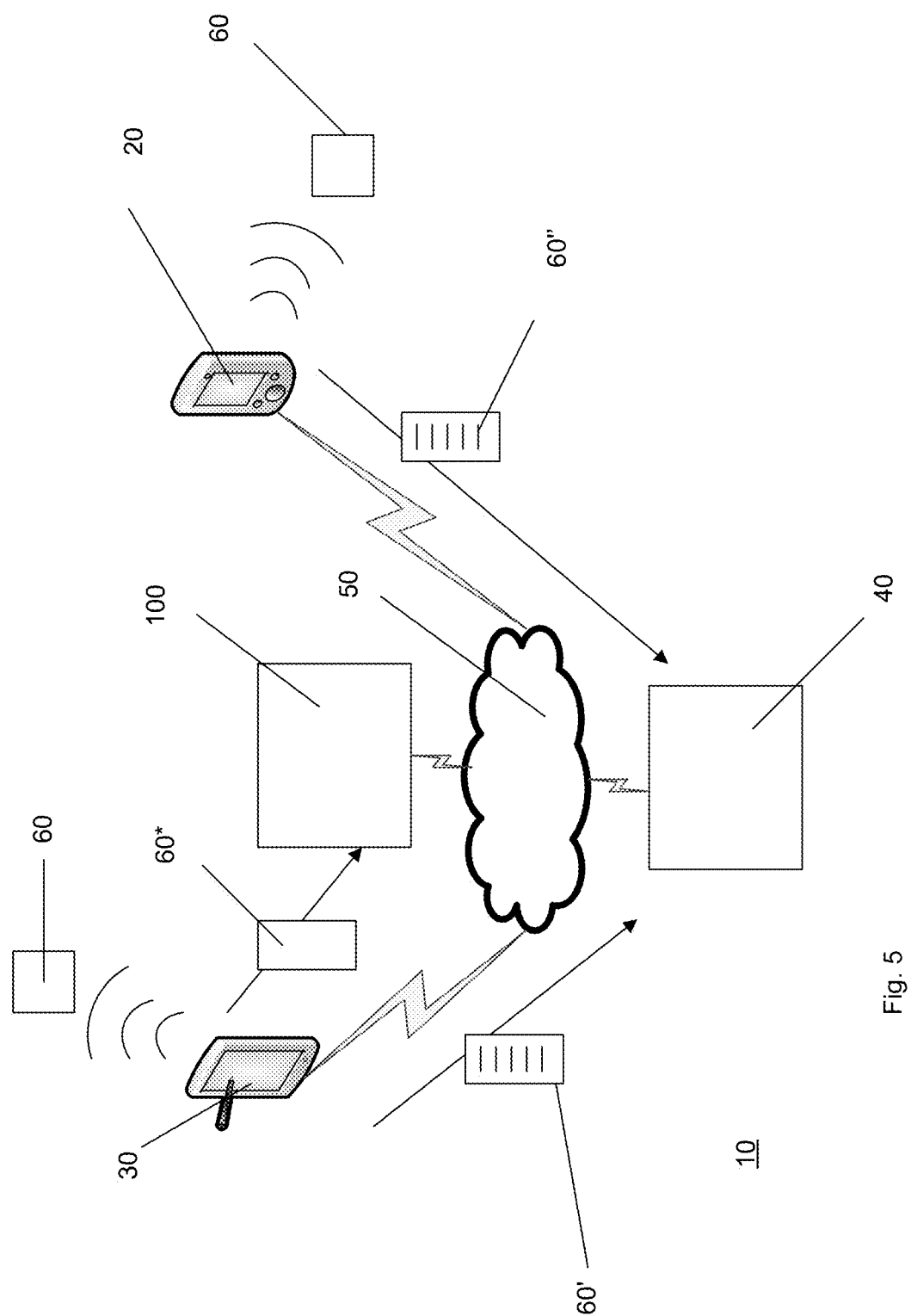
FIG. 5 is a schematic diagram of a control system according to another embodiment of the present invention.

FIG. 5 is a schematic diagram of a control system according to another embodiment of the present invention.

The embodiment of FIG. 5 corresponds to that of FIGS. 1 and 2 but includes a backup data repository 100 to which the tag writer 30 writes data 60* that is used to generate the security identifier against the tag's unique identifier. Upon a tag failing authentication, the tag reader 20 triggers re-writing of the data in the tag based on the data 60* in the backup data repository 100. Optionally or alternatively, some or all of the data in the backup data repository may include default values for the tag.

The device performing the check of a tag (a kiosk for example) could reprogram the tag with the correct data. This may be automatic or subject to customer or staff approval via a user interface at the kiosk or at a remotely manned workstation or the like.

Optionally, the security flag (which triggers alarms at exit to a building etc) may be set by default if the tag is reprogrammed, irrespective of whether it was previously enabled or disabled according to the backup data repository 100. This allows for detection of someone interfering with tags.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

What is claimed is:

1. A tag security system comprising: a tag writer, a tag reader, a programmable tag and a remote data repository, the programmable tag having a unique identifier, the tag writer being configured to generate a security identifier during writing of data to the tag, the security identifier being dependent on one or more of the data written, data already on the tag, metadata associated with the data, the tag and/or the writing of the data, wherein the tag writer is further configured to write the security identifier to the remote data repository, the tag writer being configured to link the security identifier in the remote data repository to the unique identifier, the tag reader being configured to recreate the security identifier during reading of data from the tag, wherein the tag reader is configured to use the unique identifier to verify the security identifier against the security identifier in the remote data repository, the security identifier further being non-recreatable upon changing of predetermined portions of data in the tag.

2. The tag security system of claim 1, wherein the security identifier is a selected one of a checksum, hash or encrypted digest.

3. The tag security system of claim 1, wherein the security identifier is derived from security status data held by the tag and/or content of a user memory area of the tag.

4. The tag security system of claim 1, wherein at least a part of the security identifier is written integrally to the data on the tag, wherein reprogramming of the tag changes or deletes the security identifier.

5. The tag security system of claim 1, wherein the unique identifier is physically written on one or more of the tag and its packaging and is obtained from the tag and/or packaging for writing of the security identifier to the remote repository.

6. The tag security system of claim 1, wherein the tag writer is further arranged to write data to a backup data repository, the data being data on the tag from which the security identifier is derived.

7. The tag security system of claim 6, wherein upon the recreated security identifier not matching the security identifier in the remote data repository, the tag security system being configured to overwrite data in the tag from data in the backup data repository.

8. The tag security system of claim 1, wherein the tag writer is configured to use a subset of data on the tag to generate the security identifier.

9. The tag security system of claim 8, wherein a pattern to determine the subset is encoded for the tag in a remote data repository, the tag writer being configured to retrieve the pattern and use it to determine the subset.

10. The tag security system of claim 1, wherein the tag is an RFID tag.

11. The tag security system of claim 1, wherein the tag reader is configured to use the unique identifier to retrieve the previously calculated security identifier from a remote data repository.

12. The tag security system of claim 1, wherein the tag reader is configured to communicate the recreated security identifier and the unique identifier to the remote data repository, the remote data repository being configured to compare the security identifier in the remote data repository with the recreated security identifier and return a verification result.

13. The tag security system of claim 1, wherein the tag reader is configured to recreate the security identifier by communicating data read from the tag to the remote data repository with the unique identifier, the remote data repository being configured to recreate the security identifier from the received data, compare the security identifier in the remote data repository with the recreated security identifier and return a verification result.

14. The tag security system of claim 1, wherein upon the recreated security identifier not matching the security identifier in the remote data repository, the tag security system being configured to overwrite data in the tag with default values in a backup data repository.

15. A method for securing a programmable tag, the programmable tag having a unique identifier, the method comprising:
  generating a security identifier during writing of data to the tag, the security identifier being dependent on one or more of the data written, data already on the tag, metadata associated with the data, the tag and/or the writing of the data;
  storing the security identifier in a remote data repository for future authentication of the tag and security identifier;
  linking the security identifier in the remote data repository to the unique identifier of the tag; and
  subsequently authenticating the data on the tag by recreating the security identifier from data on the tag and comparing the recreated security identifier to the stored security identifier in the remote data repository using the unique identifier, wherein the security identifier is non-recreatable upon changing of predetermined portions of the data in the tag.

16. The method of claim 15, further comprising deriving the security identifier from security status data held by the tag and/or content of a user memory area of the tag.

17. The method of claim 15, further comprising writing at least a part of the security identifier integrally to the data on the tag, whereby reprogramming of the tag changes or deletes the security identifier.

18. The method of claim 15, wherein the unique identifier is physically written on one or more of the tag and its packaging, the method further comprising obtaining the unique identifier from the tag and/or packaging for writing of the security identifier to the remote repository.

* * * * *